UNITED STATES PATENT OFFICE.

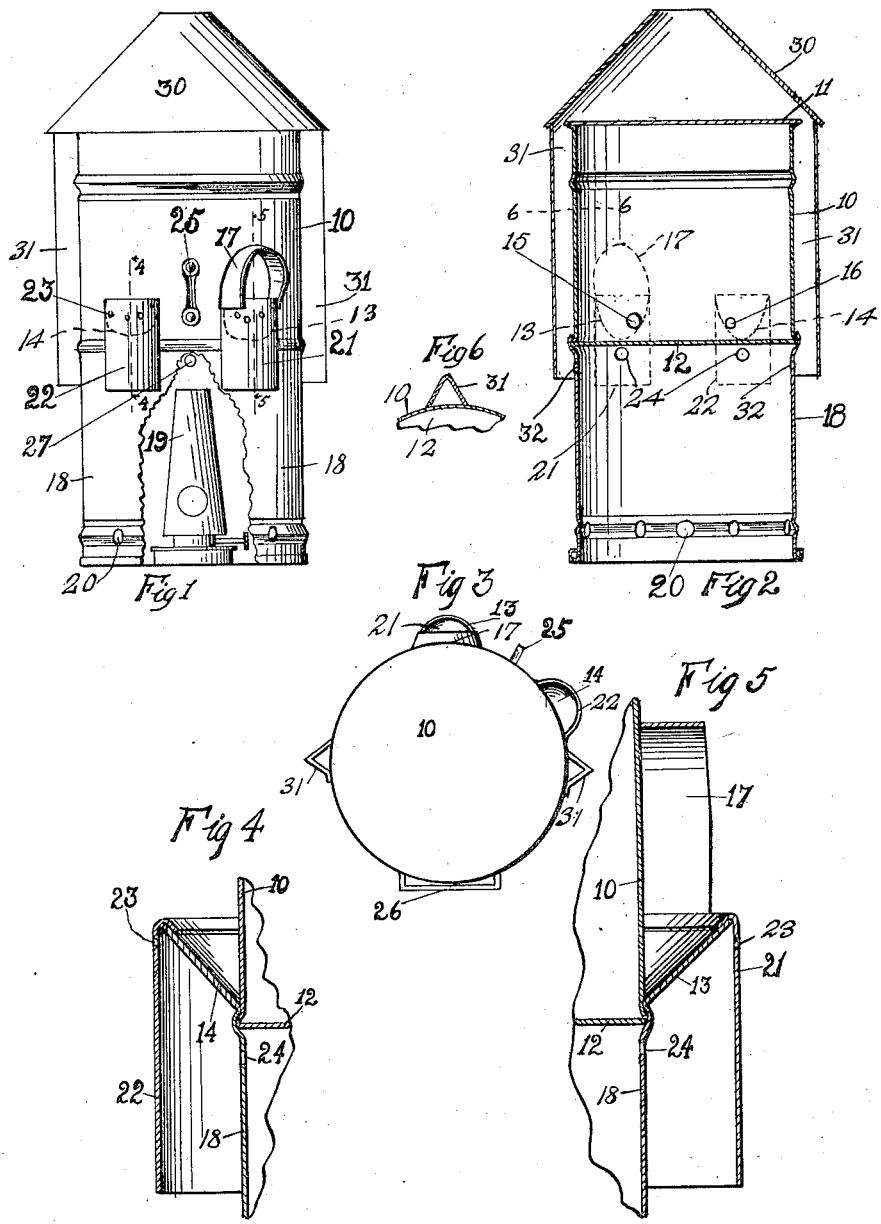

CHESTER C. FIFIELD, OF DES MOINES, IOWA.

NON-FREEZABLE WATERING DEVICE.

1,348,489. Specification of Letters Patent. Patented Aug. 3, 1920.

Application filed February 10, 1919. Serial No. 276,205.

*To all whom it may concern:*

Be it known that I, CHESTER C. FIFIELD, a citizen of the United States, and resident of Des Moines, in the county of Polk and State of Iowa, have invented a certain new and useful Non-Freezable Watering Device, of which the following is a specification.

The object of my invention is to provide a non-freezable watering tank of very simple and inexpensive construction.

More particularly it is my object to provide a device of the kind mentioned, comprising an upper tank provided with spaced drinking troughs located near each other and communicating with the interior of the tank at points below the edges of said troughs, said tank being otherwise closed, and to provide in connection with said tank a lower cylindrical member designed to serve as a compartment for a heating member.

A further object is to provide in such a device shield members for the troughs, and to form the lower cylindrical member with openings for carrying products of combustion into the spaces between the shield members and the troughs, for heating the troughs at all times.

With these and other objects in view, my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a front elevation partly broken away of a non-freezable watering device embodying my invention.

Fig. 2 shows a transverse, vertical, sectional view through the same, looking toward the front side of the device.

Fig. 3 shows a top or plan view of the device, the false roof being omitted to permit a better showing of the other parts.

Fig. 4 shows a vertical, sectional view through the walls of the device, one of the troughs and shield therefor, taken on the line 4—4 of Fig. 1.

Fig. 5 shows a similar view through the other trough, taken on the line 5—5 of Fig. 1; and Fig. 6 shows a horizontal, sectional view taken on the line 6—6 of Fig. 2.

In the accompanying drawings I have used the reference numeral 10 to indicate generally the upper tank or receptacle forming the part of my improved non-freezable watering device. This receptacle has a top 11 and a bottom 12, and is closed except for the openings in the troughs hereinafter mentioned.

On the outside of the receptacle 10, near the bottom thereof, are preferably mounted two troughs 13 and 14, having their walls inclined from the bottom of the receptacle upwardly and outwardly, as illustrated in Figs. 3, 4, and 5. These troughs are spaced from each other far enough to allow chickens or the like to drink freely, and yet are located rather close together on one side of the receptacle for the reasons that will hereafter be more fully explained.

The wall of the receptacle 10 is provided with openings 15 and 16, whereby communication is permitted between the interior of the receptacle and the respective troughs 13 and 14. These holes are as near together as they can be placed, as illustrated in Fig. 2.

Above the trough 13 is provided a curved hood 17 which is used in the manner hereinafter mentioned in filling the receptacle.

Below the receptacle is a cylindrical heating chamber 18, designed to receive a suitable heating device 19. The heating chamber 18 is provided with ventilation openings 20 near its lower portion.

For each of the troughs 13 and 14 there is provided a shield and heat retaining member 21 and 22, extending from the upper edges of the respective troughs downwardly, as illustrated in Figs. 4 and 5. These shields 21 and 22 are formed from a strip of sheet metal rolled until arcuate in cross section to correspond with the outline of the upper edge of the troughs 13 and 14. The side edges of the shields are secured then to the sides of the tank 10 and the member 18 by any ordinary means, as for instance, soldering, and the upper ends of the shields are then rolled to fit over the upper edges of the troughs 13 and 14, where they may, if desired, be soldered in place. The shields 21 and 22 are provided with openings 23 in their upper parts adjacent to the outer edges of the troughs.

The heating chamber 18 is provided with openings 24 in its upper portion, for allowing hot air to pass into the compartments formed by the troughs and the shields below the troughs.

Located midway between the troughs is a handle 25, arranged to be in proper place for balancing the device as nearly as possible under all circumstances, and particularly when the receptacle 10 is full of water.

On what I may call the back of the receptacle 10, opposite the trough 13, is a suitable supporting means 26.

I preferably provide a cone shaped false roof or cover 30 above the receptacle 10, the walls of which project beyond said receptacle as shown in Fig. 2. Extending downwardly from the roof 30 are channel shaped conducting passages 31 secured to the receptacle 10 and extending to points below the bottom 12. The heating chamber 18 has holes 32 for permitting hot air to pass upwardly into and through the passages 31 so that a layer of warm air may be provided below the roof 30 above the top 11 of the receptacle 10.

In the practical use of my improved non-freezable watering device, the device is grasped by the handle 25 and rested on the ground or suitable support, on the supporting means 26. Water may then be poured into the trough 13, and the hood 17 serves as a means for retaining water for causing it to flow through the hole 15. The holes 15 and 16 are located as nearly together as possible so as to permit the receptacle 10 to be filled almost full.

When water is poured in through the hole 15, the hole 16 serves as an air escape vent.

After the receptacle 10 has been filled in the manner just described, it may be grasped by the handle 25 and the entire device may then be stood upright, as shown in Figs. 1 and 2. Insomuch as the receptacle 10 is closed except for the openings 15 and 17, water will not escape because the troughs surrounding the openings 15 and 16 will make it possible to form a water seal in each trough. Yet some water will stand in each trough, so that the chickens may drink from it. As the water is drunk from the trough and is lowered, more water will escape into the trough and a corresponding volume of air is permitted to pass into the receptacle 10.

The device may be used in warm weather without the heating element 19, and in cold weather the heating element is used. Hot air will pass upwardly and through the openings 24 into the heat retaining compartments formed by the bottoms of the troughs and the shields 21. The openings 23 are preferably quite small so as to allow the hot air to escape fast enough to provide for circulation and to keep the water in the troughs warm. The heating chamber 18 is provided with a ventilation opening 27 at the back, for permitting the escape of burned gases and hot air and assisting in providing for proper circulation.

It will be seen that with a tank of the construction herein shown, I am able to use a plurality of troughs to which the chickens may have access, yet am able to do away with the necessity for using a screw cap or other means which is likely to get out of order, for closing the air vent.

The use of two troughs located close together on the same side of the receptacle 10, particularly when in connection with the hood 17, permits the receptacle 10 to be readily filled when turned on its back, yet provides the water seal for each trough when the receptacle is set upright, and permits the receptacle to be filled almost full.

By using the shield 21 and providing the said shields and the heating chamber 18 with the openings 23 and 24, the water in the outside troughs will be kept warm enough to prevent freezing, at all times when the heating element is operative.

The entire device is of very simple and inexpensive construction, and is free from any removable parts which are likely to become lost or misplaced. The construction herein shown also makes it possible to avoid the use of adjustable closure devices for the vent opening, which are likely to become leaky in time.

The supporting means 26 is located substantially opposite the trough 13 to keep the tank, when made in cylindrical form, from rolling when the tank is being filled, and to be substantially opposite the place where the water enters the tank for convenience in filling the tank or receptacle 10.

The compartments formed by the shields 21 are open at their lower ends for affording freer movement of air upwardly between the shields and the heating chamber.

It will be noted that the handle 25 is located between the troughs 13 and 14, and can thus be placed low enough on the receptacle 10 to be in proper position for balancing the entire device when filled with water, and yet is in such position as to make it convenient for placing the device on its back, resting on the supporting means 26.

The device may be set in the ground, or may be used with any suitable platform or approach for permitting chickens or other animals or fowls to drink conveniently from the troughs.

Some changes may be made in the construction and arrangement of the various parts of my improved non-freezable watering device without departing from the essential spirit and purpose of my invention, and it is my purpose to cover by my claims any modified forms of structure or use of mechanical equivalents which may be reasonably included within the scope of such claims.

I claim as my invention:

1. In a device of the class described, a receptacle having on its outside spaced troughs, both located on one-half of the receptacle, said receptacle being provided with openings into the said troughs and being otherwise closed, a cylindrical heating chamber below said receptacle, a shield forming a heat retaining member on each trough extending downwardly therefrom, having openings in its upper portion adjacent to a trough, said heating chamber having openings in its side wall for permitting hot air to pass into a space below said troughs.

2. In a device of the class described, a receptacle, spaced troughs mounted on the lower portion of said receptacle near each other, having inclined walls, said receptacle having openings as near to each other as possible, communicating with said troughs and being otherwise closed, a hood adjacent to the upper part of one of said troughs, a supporting means on said receptacle on the side thereof opposite said last named trough, and a handle located on said receptacle between said troughs near the lower portion of the receptacle.

3. In a device of the class described, a tank, a trough mounted thereon and adapted to be filled therefrom, a heating chamber formed below said tank, adapted to receive a heating device adjacent to the bottom thereof, a cover member disposed above the tank and adapted to form a warm air chamber above the tank, means for forming a conducting passageway down the side of the tank, the upper end of which communicates with the warm air chamber and the lower end being open, and means for permitting the hot air in the heating chamber to enter said conducting passageway at a point spaced upwardly from the bottom thereof.

4. In a device of the class described, a tank, a trough mounted thereon and adapted to be filled therefrom, a heating chamber formed below said tank, adapted to receive a heating device adjacent to the bottom thereof, a shield and heat retaining member extended downwardly from the upper edges of the trough to position spaced below the top of the chamber, said shield being shaped to form an air passage with an outlet opening adjacent to its upper portion, and an inlet opening at the bottom thereof, and means for permitting the hot air in the heating chamber to enter said shield at a point spaced upwardly from the bottom thereof.

5. In a device of the class described, a tank, a trough mounted thereon and adapted to be filled therefrom, a heating chamber formed below said tank, adapted to receive a heating device adjacent to the bottom thereof, a shield and heat retaining member extended downwardly from the upper edges of the trough to position spaced below the top of the chamber, said shield being shaped to form an air passage with an outlet opening adjacent to its upper portion and an inlet opening at the bottom thereof, a cover member disposed above the tank and adapted to form a warm air chamber above the tank, means for forming a conducting passageway down the side of the tank, the upper end of which communicates with the warm air chamber and the lower end being open, and means for permitting the hot air in the heating chamber to enter said shield and said conducting passageway at points spaced upwardly from the bottom thereof.

CHESTER C. FIFIELD.